(12) United States Patent
Ouyang et al.

(10) Patent No.: US 10,805,508 B2
(45) Date of Patent: Oct. 13, 2020

(54) IMAGE PROCESSING METHOD, AND DEVICE

(71) Applicant: GUANGDONG OPPO MOBILE TELECOMMUNICATIONS CORP., LTD., Dongguan, Guangdong (CN)

(72) Inventors: Dan Ouyang, Guangdong (CN); Guohui Tan, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 44 days.

(21) Appl. No.: 16/130,885

(22) Filed: Sep. 13, 2018

(65) Prior Publication Data
US 2019/0132495 A1  May 2, 2019

(30) Foreign Application Priority Data
Nov. 1, 2017 (CN) .......................... 2017 1 1060087

(51) Int. Cl.
*H04N 5/222* (2006.01)
*G06T 5/00* (2006.01)
(Continued)

(52) U.S. Cl.
CPC ........... *H04N 5/2226* (2013.01); *G06T 5/002* (2013.01); *G06T 7/194* (2017.01);
(Continued)

(58) Field of Classification Search
CPC .. H04N 5/2226; H04N 5/23232; H04N 5/272; G06T 5/002; G06T 7/194;
(Continued)

(56) References Cited

U.S. PATENT DOCUMENTS 10,200,623 B1 * 2/2019 Baldwin .............. H04N 5/2258
2012/0133746 A1   5/2012 Bigioi et al.
(Continued)

FOREIGN PATENT DOCUMENTS

CN    104253939    12/2014
CN    105450931     3/2016
(Continued)

OTHER PUBLICATIONS

EPO, Office Action for EP Application No. 18202824, dated Feb. 12, 2019.
(Continued)

*Primary Examiner* — Nhan T Tran
(74) *Attorney, Agent, or Firm* — Hodgson Russ LLP

(57) ABSTRACT

The present disclosure provides an image processing method, and a device. The method includes controlling a first camera to capture a plurality of first images and controlling a second camera to capture a plurality of second images; acquiring a first reference image from the plurality of first images and acquiring a second reference image from the plurality of second images; performing composition and noise reduction processing on the plurality of primary images by a first thread to generate a composited and noise-reduced image and processing the composited and noise-reduced image according to a preset image processing strategy to generate a target image and acquiring depth of field information based on the first reference image and the second reference image by a second thread; and blurring a background region of the target image according to the depth of field information.

15 Claims, 6 Drawing Sheets

(51) Int. Cl.
  *G06T 7/194* (2017.01)
  *H04N 5/232* (2006.01)
  *H04N 5/272* (2006.01)
(52) U.S. Cl.
  CPC ......... *H04N 5/23232* (2013.01); *H04N 5/272* (2013.01); *G06T 2207/20012* (2013.01); *G06T 2207/20228* (2013.01)
(58) Field of Classification Search
  CPC . G06T 2207/20228; G06T 2207/20012; G06T 5/008; G06T 5/50
  See application file for complete search history.

(56) References Cited

U.S. PATENT DOCUMENTS

2014/0055450 A1     2/2014  Limonov et al.
2014/0072205 A1*    3/2014  Ishii ................. G06T 15/08
                                                       382/154
2014/0078262 A1*    3/2014  Yun .................. H04N 13/161
                                                        348/47
2016/0273909 A1     9/2016  Nobayashi
2018/0035058 A1*    2/2018  Thumpudi ............ G06T 7/90
2018/0227478 A1*    8/2018  Li ................... H04N 5/2258

FOREIGN PATENT DOCUMENTS

CN    105513007    4/2016
CN    105763813    7/2016
CN    108024054    5/2018

OTHER PUBLICATIONS

SIPO, First Office Action for CN Application No. 201711060087, dated Apr. 3, 2019.
WIPO, English translation of the ISR and WO for PCT/CN2018/113095, dated Jan. 31, 2019.

* cited by examiner secondary image     primary image     disparity image

IMAGE PROCESSING METHOD, AND DEVICE

CROSS-REFERENCE TO RELATED APPLICATION

The present application is based upon and claims priority to Chinese Patent Application No. 201711060087.1, filed on Nov. 1, 2017, the entire contents of which are incorporated herein by reference.

FIELD

The present disclosure relates to image processing technologies, and more particularly to an image processing method, and a device.

BACKGROUND

With the progress of terminal device production technology, most of terminal devices adopt dual cameras which are typically configured to acquire depth of field information, such that diversification capturing requirements of users can be satisfied by performing related image processing according to the depth of field information.

DISCLOSURE

The present disclosure provides an image processing method, and a device.

Embodiments of the present disclosure provide an image processing method. The method includes: controlling a first camera to capture a plurality of first images and controlling a second camera to capture a plurality of second images; acquiring a first reference image from the plurality of first images and acquiring a second reference image from the plurality of second images, the second reference image and the first reference image being captured in an association manner and forming a pair of images; performing composition and noise reduction processing on the plurality of first images by a first thread to generate a composited and noise-reduced image and processing the composited and noise-reduced image according to a preset image processing strategy to generate a target image and acquiring depth of field information based on the first reference image and the second reference image by a second thread; and blurring a background region of the target image according to the depth of field information.

Embodiments of the present disclosure further provide a computer device including a memory, a processor, and a computer program stored on the memory and executable on the processor. When the processor executes the computer program, the processor is caused to perform the image processing method described above.

Embodiments of the present disclosure further provide an image processing method. The method includes: controlling a first camera to capture a first image and controlling a second camera to capture a second image; processing the first image according to a preset image processing strategy by a first thread to generate a target image and acquiring depth of field information based on the first image and the second image by a second thread; and blurring a background region of the target image according to the depth of field information.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings.

EMBODIMENTS OF THE PRESENT DISCLOSURE

Reference will now be made in detail to exemplary embodiments, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

In the related art, since it takes a long time to acquire the depth of filed information, the time for the related image processing based on the depth of field information is long, thereby causing a low image processing efficiency.

An image processing method, an image processing apparatus, and a device according to embodiments of the present disclosure will be described below with reference to accompanying drawings.

An execution subject of the image processing method according to the embodiments of the present disclosure may be a hardware device having dual cameras, such as a cell phone, a tablet computer, a personal digital assistant, a wearable device. The wearable device may be a smart bracelet, a smart watch, smart glasses or the like.

Figure 1:
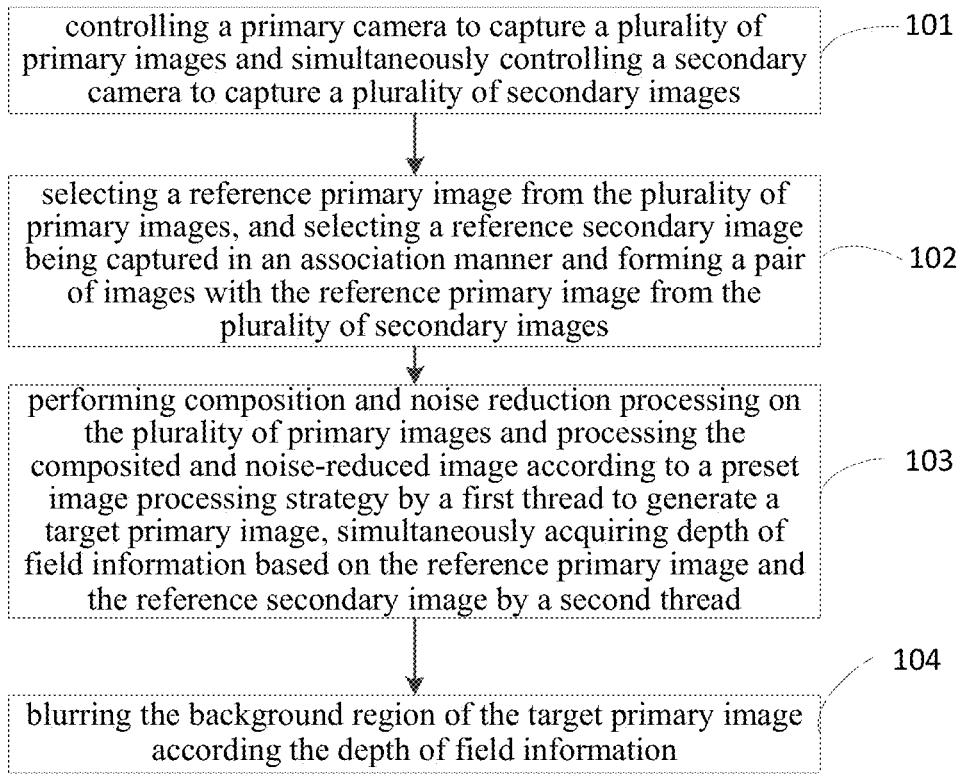
FIG. 1 is a flow chart of an image processing method according to an embodiment of the present disclosure.

FIG. 1 is a flow chart of an image processing method according to an embodiment of the present disclosure. As illustrated in FIG. 1, the method may include the followings.

At block 101, a first camera (i.e., primary camera in embodiments of the present disclosure) is controlled to capture a plurality of first images (also called as a plurality of primary images) and simultaneously a second camera (i.e., secondary camera in embodiments of the present disclosure) is controlled to capture a plurality of second images (also called as a plurality of secondary images).

In this embodiment, based on the primary image captured by the primary camera and the secondary image captured by the secondary camera, depth of filed information of a same object in the primary image and the secondary image is acquired. The primary image is configured as a basic image for a final real image. In order to avoid a situation that depth of field information cannot be acquired accurately due to a significant difference between the primary image and the secondary image when acquiring the depth of field information based on the primary image and the secondary image, or a situation that a poor image quality of the final real image due to the unsharpness of the primary image, the primary camera is controlled to capture the plurality of primary images and simultaneously the secondary camera is controlled to capture the plurality of secondary images, such that the optimized pair of primary image and secondary image can be selected from the plurality of primary images and the plurality of secondary images, thereby improving the accuracy of acquiring the depth of field information and the image quality of the final image.

In the prior art, the dual cameras have a poor imaging effect under a low light environment and a better imaging effect under a high light environment due to the sufficient light. Under the high light environment, the primary image and the secondary image have a high image definition, in this case, the primary camera is controlled to capture one primary image and the secondary camera is controlled to capture one secondary image simultaneously, and the accuracy of acquiring the depth of field information can be ensured and a better imaging effect can be acquired. Accordingly, in order to release processing pressure, the plurality of primary images and the plurality of secondary images are only captured under the low light environment.

In an embodiment, brightness of a capturing environment is detected, for example, by an optical sensor in the terminal device. When the detected brightness is less than a predetermined threshold, it indicates that the current environment may influence the imaging effect of the terminal device, such that the primary camera is controlled to capture the plurality of primary images and the secondary camera is controlled to capture the plurality of secondary images simultaneously.

The predetermined threshold may be a reference brightness determined according to a lot of experiment data and configured to determine whether the ambient brightness influences the imaging effect. The predetermined threshold may be related with imaging hardware of the terminal device. The better the photosensitivity of the imaging hardware is, the lower the predetermined threshold is.

At block 102, a first reference image (also called as a reference primary image) is selected from the plurality of primary images, and a second reference image (also called as a reference secondary image) captured in an association manner and forming a pair of images with the reference primary image is selected from the plurality of secondary images. The reference primary image and the reference secondary image being captured in an association manner may refer to that the reference primary image and the reference secondary image are captured at the same time or that the reference primary image and the reference secondary image are captured according to a predetermined capturing strategy. For example, the predetermined capturing strategy may refer to that the $n^{th}$ primary image captured by the primary camera is configured as the reference primary image, while the $n^{th}$ secondary image captured by the secondary camera is configured as the reference secondary image.

At block 103, composition and noise reduction processing is performed by a first thread on the plurality of primary images to generate a composited and noise-reduced image and the composited and noise-reduced image is processed according to a preset image processing strategy to generate a target primary image, simultaneously depth of field information is acquired based on the reference primary image and the reference secondary image by a second thread.

As described above, the system with dual cameras acquires the depth of field information based on the primary image and the secondary image. In order to clearly describe a process of acquiring the depth of field information by the dual cameras, a principle of acquiring the depth of field information by the dual cameras is described with reference to accompanying drawings.

Figure 2:
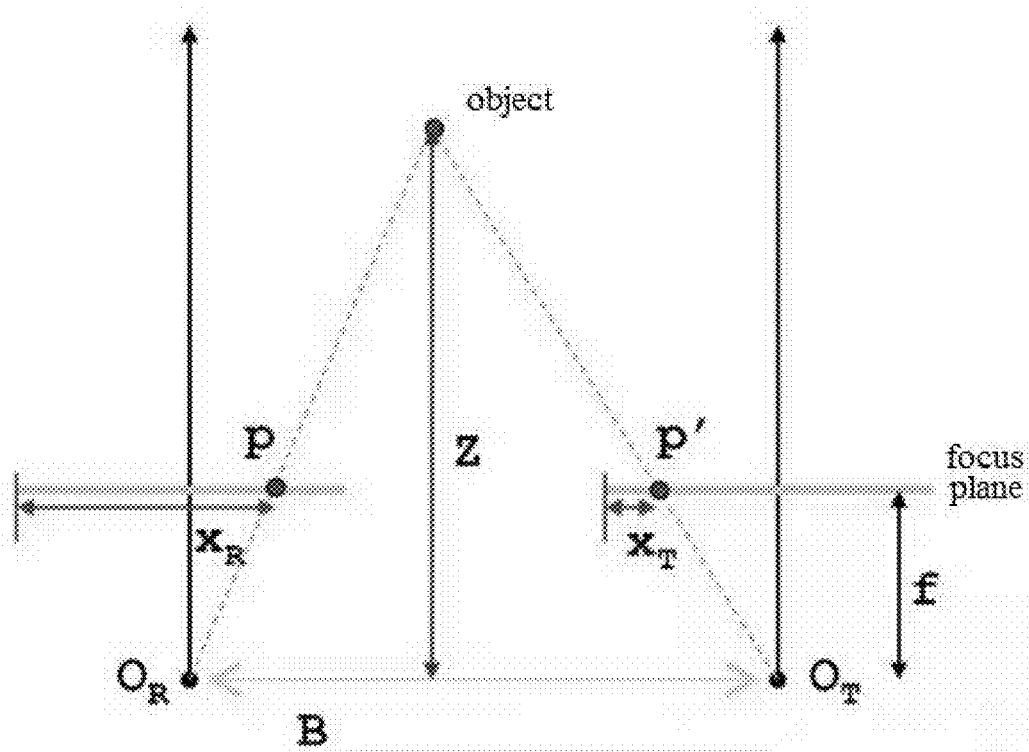
FIG. 2 is a schematic diagram illustrating a principle of triangulation measurement according to an embodiment of the present disclosure.

In practice, the depth of field information is acquired by human eyes with the aid of vision of both eyes, the principle of which is suitable to the dual cameras and realized depending on a principle of triangulation measurement illustrated in FIG. 2. As illustrated in FIG. 2, in practical space, an imaging object, positions $O_R$ and $O_T$ of two cameras, a focus plane of the two cameras are illustrated. A distance between the focus plane and a plane where the two cameras are located is f. The two cameras form images on the focus plane.

P and P' represent positions of a same object in different images. A distance between P and a left boundary of the image having the point P is $X_R$, a distance between P' and a left boundary of the image having the point P' is $X_T$. $O_R$ and $O_T$ represent two cameras which are in a same plane and have a distance B with each other.

Based on the principle of triangulation measurement, since a distance between the object and the plane where the two cameras are located is Z, and a formula $$\frac{B}{Z} = \frac{(B + X_T) - X_R}{Z - f}$$

can be established.
A formula $$Z = \frac{B \cdot f}{X_R - X_T} = \frac{B \cdot f}{d}$$

can be derived, where d represents a distance difference between positions of the same object in different images. Since B and f is fixed, Z can be acquired according to d.

In addition to the triangulation measurement, other approaches can be used to acquire the depth of field information of the primary image. For example, when the primary camera and the secondary camera capture images with respect to a same scenario, the distance between the object in the scenario and cameras is proportionate to a displacement difference, a gesture difference between the primary camera and the secondary camera. In an embodiment of the present disclosure, the distance Z can be acquired according to the proportionate relation.

Figure 3:
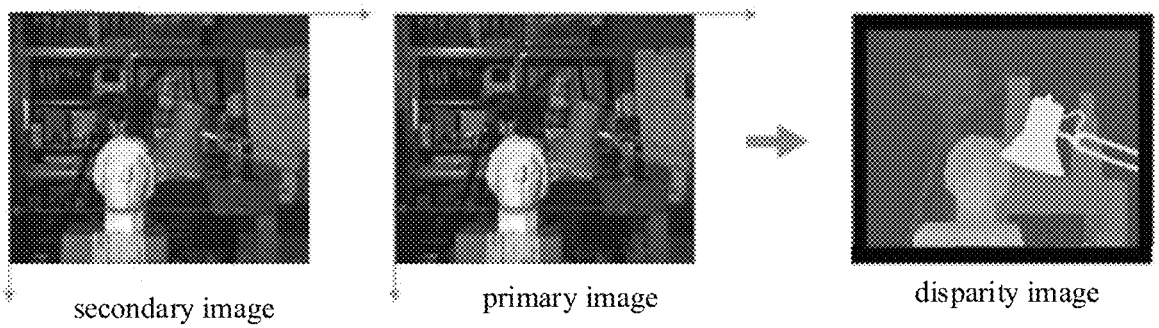
FIG. 3 is a schematic diagram illustrating a process of acquiring depth of field information by dual cameras according to an embodiment of the present disclosure.

For example, as illustrated in FIG. 3, the primary image is captured by the primary camera, and the secondary image is captured by the secondary camera. The difference between the primary image and the secondary image is calculated and represented by a disparity image. The disparity image illustrates the displacement difference between the same points in two different images. Since the displacement difference is proportionate to Z in the triangulation measurement, the disparity image can be used as an image carrying the depth of field information.

As described above, when the dual cameras acquire the depth of field information, a position of a same object needs to be acquired in different images. If the images captured by the dual cameras acquiring the depth of field information are close, the accuracy and efficiency of acquiring the depth of field information can be improved.

In embodiments of the present disclosure, since the primary camera and the secondary camera capture the plurality of primary images and the plurality of secondary images simultaneously, the primary image and the secondary image belonging to a pair of images which are captured at the same time are close, such that the accuracy of acquired depth of field information can be ensured by acquiring the depth of field information according to the original primary image and the secondary image before the composition and noise reduction processing.

When an image is captured under the low light environment, as mentioned above, the noisy points of the plurality of primary images and the plurality of secondary images are high. In this case, in order to further improve the accuracy of acquiring the depth of field information, the composition and noise reduction processing can be performed on the plurality of secondary images, and the depth of field information can be acquired according to the composited and noise-reduced secondary image and the primary image.

In an embodiment, the reference primary image is selected from the plurality of primary images and the reference secondary image is selected from the plurality of secondary images. In practice, during a capturing process, the primary image and the secondary image are captured at the same frequency to acquire the plurality of primary images and the plurality of secondary images. The primary image and the secondary image captured at the same time belong to a pair of images. For example, according to the chronological order, the plurality of primary images captured by the primary camera include: primary image 11, primary image 12 . . . and so on. The plurality of secondary images captured by the secondary camera include: secondary image 21, secondary image 22 . . . and so on. The primary image 11 and the secondary image 21 belong to a pair of images. The primary image 12 and the secondary image 22 belong to a pair of images. In order to further improve the accuracy and efficiency of acquiring the depth of field information, the reference primary image with high definition can be selected from the plurality of primary images. When there are many frames in the plurality of images, in order to improve the selection efficiency, several frames of primary images and several corresponding frames of secondary images can be selected according to the image definition. The reference primary image and the reference secondary image are selected from the primary images with the image definition in the top rank and the corresponding secondary images.

Further, since it takes a long time to acquire the depth of field, the first thread is used to perform the composition and noise reduction processing on the plurality of primary images to generate the target primary image, and simultaneously the second thread is used to acquire the depth of field information based on the reference primary image and the reference secondary image. On one hand, at the time when the depth of field information is acquired, the composition and noise reduction processing is performed on the plurality of primary images to acquire the target primary image, such that the blurring processing can be performed according to the depth of field information and the target primary image after the depth of field information is acquired. Compared with the way of acquiring the depth of field information firstly and then performing the composition and noise reduction processing on the primary images, the image processing efficiency is improved. On the other hand, the composition and noise reduction processing performed on the plurality of primary images enables the target primary image to have clear detail and high image quality, such that the image subjected to the blurring processing has a good effect.

In order to better understand the multi-frames composition and noise reduction processing, the multi-frames composition and noise reduction processing performed on the primary images under the low light environment is described.

When the ambient light is low, the imaging device such as the terminal device typically captures images with a way of automatically increasing photosensitivity. However, this way of automatically increasing photosensitivity causes noise in the image. The multi-frames composition and noise reduction processing aims to reduce the noise points in the image and improve the image quality off the image captured with a high photosensitivity. The principle is based on the prior knowledge that the noise points are unordered. After the plurality of images are captured successively, the noise point at the same position may be a red noise point, a green noise point, a white noise point, or even there may be no noise point, such that a screening condition can be implemented as follows. The pixel points (i.e., noise points) belonging to noise are screened out according to values of pixel points corresponding to a same position and located in the plurality of images. The value of a pixel point includes a number of pixels in the pixel point. The more pixels are contained in the pixel point, the higher the value of the pixel point is, and the high the sharpness of the corresponding image is. Further, after the noise points are screened out, color guessing and pixel substitution can be performed on the noise points according to a predetermined algorithm to realize the effect of eliminating the noise points. After the process, the noise reduction effect with low loss in image quality can be realized.

As a simple multi-frames composition and noise reduction approach, after the plurality of images are captured, the values of pixel points corresponding to the same position and in the plurality of images are read out and averaged to calculate a weighted average value as a value of the pixel point in the composited image. In this way, the image with high definition can be acquired.

Further, there is time difference between a length of time for acquiring the depth of field information by the second thread and a length of time for composition and noise reduction processing performed by the first thread. In order to further improve the image processing efficiency, other image processing operations can be performed by taking full advantage of the time difference.

The implementations of the first thread and the second thread will be described in cases that the brightness of environment is relative high and the brightness of environment is relative low.

When the brightness of the capturing environment is less than the predetermined threshold, the implementations of the thread can be described as follows.

In an embodiment, performing the composition and noise reduction processing on the plurality of primary images by the first thread to generate the target primary image may include: performing the composition and noise reduction processing on the plurality of primary images and processing the composited and noise-reduced image according to a preset image processing strategy by the first thread, to generate the target primary image.

The preset image processing strategy may include filter applying operation, beautification operation, or the like. At the same time when the second thread acquires the depth of filed information, which costs a long time, the first thread may perform other image processing operations besides the composition and noise reduction processing, such that the time difference between the time cost by the first thread and the time cost by the second thread can be used to complete more image processing operations before the blurring processing is performed, thereby further improving the image processing efficiency. Before the blurring processing is performed, the more image processing operations are implemented on the basis of the composited and noise-reduced image, since the composited and noise-reduced image has a high image quality, the more image processing operations may achieve a better processing effect.

For example, at the same time when the second thread acquires the depth of filed information, which costs a long time, besides the composition and noise reduction processing, the first thread may perform beautification operation on the composited and noise-reduced image to generate the target primary image. When the blurring processing is performed, the image has been subjected to the beautification operation, which greatly improves the image processing efficiency.

In practice, in order to take full advantage of the time difference between the time cost by the first thread and the time cost by the second thread, the time when the first thread finishes operations and the time when the second thread finishes operations may close to each other. Further, according to the time difference, the image processing strategy can be set to ensure that operations corresponding to the image processing strategy can be finished when the second thread finishes operations.

Figure 4:
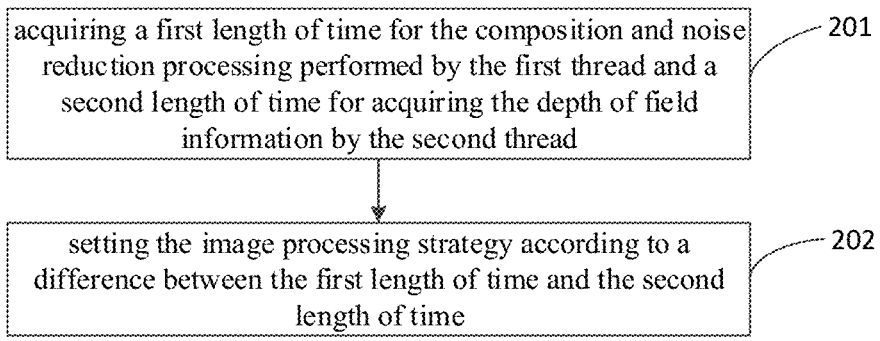
FIG. 4 is a flow chart of an image processing method according to another embodiment of the present disclosure.

In an embodiment, as illustrated in FIG. 4, before block 103, the image processing method may further include the followings.

At block 201, a first length of time for the composition and noise reduction processing performed by the first thread and a second length of time for acquiring the depth of field information by the second thread can be acquired.

The first length of time is related to a running speed of a processing system of the terminal device and a number of frames of the primary images. The first length of time can be calculated according to the running speed of the processing system of the terminal device and the number of frames of the primary images using a correlation algorithm. The second length of time is related to the running speed of the processing system of the terminal device and image definition. The second length of time can be calculated according to the running speed of the processing system of the terminal device and the image definition of the reference primary image and the reference secondary image using a correlation algorithm.

At block 202, the image processing strategy is set according to a difference between the first length of time and the second length of time.

Different image processing operations cost different time. In order to take full advantage of the difference between the first length of time and the second length of time, the image processing strategy can be set according to the difference between the first length of time and the second length of time to ensure that more image processing operations can be finished within the time difference.

For example, when a length of time for the composition and noise reduction processing is 400 ms, a length of time for the filter applying operation is 200 ms, a length of time for the beautification operation is 200 ms, a length of time for acquiring the depth of field information is 800 ms, if the current scenario includes the beautification operation and the filter applying operation, the beautification operation and the filter applying operation are set in the first thread, such that after the second thread acquires the depth of field information, the filter applying operation and the beautification operation are completed for the target primary image acquired by the first thread, thereby greatly improving the image processing effect.

When the brightness of the capturing environment is greater than or equal to the predetermined threshold, a parallel processing mechanism of the threads is implemented as follows.

Figure 5:
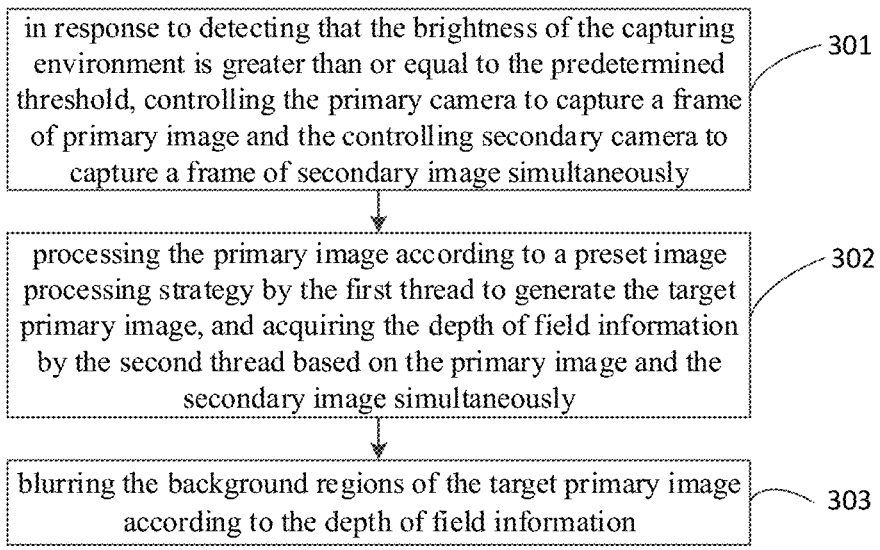
FIG. 5 is a flow chart of an image processing method according to another embodiment of the present disclosure.

In an embodiment of the present disclosure, as illustrated in FIG. 5, after the block 101 the method may further include the followings.

At block 301, in response to detecting that the brightness of the capturing environment is greater than or equal to the predetermined threshold, the primary camera is controlled to capture a frame of primary image and the secondary camera is controlled to capture a frame of secondary image simultaneously.

When the brightness of the capturing environment is greater than or equal to the predetermined threshold, it indicates that the current environment has a good brightness condition, in which the dual cameras have a high imaging quality. In order to improving the efficiency of capturing the image and releasing imaging pressure, the primary camera is controlled to capture a frame of primary image and the secondary camera is controlled to capture a frame of secondary image simultaneously, such that the frame of primary image can be used for imaging, and the frame of primary image and the frame of secondary image can be used to acquire the depth of field information.

At block 302, the primary image is processed according to a preset image processing strategy by the first thread to generate the target primary image, and the depth of field information is acquired by the second thread based on the primary image and the secondary image simultaneously.

At block 303, the background regions of the target primary image is blurred according to the depth of field information.

By processing the primary image according to a preset image processing strategy by the first thread to generate the target primary image, for example, performing optimization operation such as denoising on the primary image, and acquiring the depth of field information by the second thread based on the primary image and the secondary image simultaneously, the target primary image used for imaging can be acquired at the same time when acquiring the depth of field information, and the background region of the target primary image can be blurred according to the depth of field information.

On one hand, at the same time when acquiring the depth of field information, the primary image is processed to acquire the target primary image, such that after the depth of field information is acquired, the target primary image can be blurred directly according to the depth of field information. Compared with the way of acquiring the depth of field information firstly and then processing the primary image, the image processing efficiency is improved. On the other hand, the target primary image acquired by processing the primary image captured under a high light environment has clear detail and high image quality, such that the image subjected to the blurring processing has a good effect.

In this embodiment, in order to take full advantage of the time difference between the first thread and the second thread, the length of time for acquiring the depth of field information by the second thread can acquired and the image processing strategy can be set according to the length of time, so as to ensure that operations such as beautification operation and filter applying operation or the like corresponding to the image processing strategy can be completed when the operations performed by the second thread are completed.

For example, assuming that the length of time for processing the primary image to acquire the target primary image is 400 ms, the length of time for the filter applying operation is 200 ms, the length of time for the beautification operation is 200 ms, and the length of time for acquiring the depth of filed information is 800 ms, when the current scenario includes the beautification operation and the filter applying operation, the filter applying operation and the beautification operation can be set in the first thread, such that after the second thread acquires the depth of field information, the filter applying operation and the beautification operation for the target primary image acquired by the first thread have been completed, thus greatly improving the image processing effect.

At block 104, the background region of the target primary image is blurred according the depth of field information.

There are many ways to blur the background region of the target primary image according to the depth of field information, including and being not limited to the following ways.

As a possible implementation, first depth of field information of the foreground region and second depth of field information of the background region are acquired according to the depth of field information and a focus area, a blurring degree is generated according to the first depth of field information and the second depth of field information, and the background region of the target primary image is blurred according to the blurring degree, such that different degrees of blurring can be performed according to various depth of field information, thus causing more nature and increased layering effect of the blurred image.

After the camera is brought into focus for the captured object, a space depth range from the front to the back of the focus where the object is can be referred to a depth of field, in which a high definition image available for human eyes can be formed in the space depth range. An imaging range in front of the focus area is the first depth of field of the foreground region, and a region forming the high definition image in rear of the focus area is the second depth of field of the background region.

Different ways to determine the first depth of field information of the foreground region and the second depth of field information of the background region can be used for different application scenarios.

Way One:

Related parameters for capturing can be acquired, and the first depth of field information of the foreground region and the second depth of field information of the background region can be determined according to a formula for camera.

In this embodiment, parameters such as diameter of a permissible circle of confusion, f-number, focus length, focusing distance of the primary camera can be acquired, and the first depth of field can be calculated according the formula: first depth of field=(f-number*diameter of the permissible circle of confusion*square of focusing distance)/(square of focus length+f-number*diameter of the permissible circle of confusion*focusing distance), the foreground is distinguished according to the first depth of field information, and the second depth of field can be calculated according to the formula: second depth of field=(f-number*diameter of the permissible circle of confusion*square of focusing distance)/(square of focus length−f-number*diameter of the permissible circle of confusion*focusing distance).

Way Two:

A depth of field map of the imaging area beyond the focus area is determined according to data of the current captured image acquired by the dual cameras, and the first depth of field of the foreground region in front of the focus area and the second depth of field in rear of the focus area can be determined according to the depth of field map.

In this embodiment, since the two cameras are at different positions, there are a certain angle difference and a certain distance difference between the two rear cameras with respect to the target object to be captured, such that preview images acquired by the two cameras have a certain phase difference.

For example, for a point A on the target object to be captured, the coordinates of the pixel point corresponding to point A in the preview image of the primary camera may be (30, 50), while the coordinates of the pixel point corresponding to point A in the preview image of the secondary camera may be (30, 48). The phase difference between the pixel points corresponding to point A in the two preview images is 50−48=2.

In this embodiment, a relation between the depth of field information and the phase differences can be established according to experiment data or camera parameters in advance, such that the depth of field information can be searched according to the phase difference between pixel points corresponding to a respective point in the preview images acquired by the two cameras. In this way, the first depth of field information and the second depth of field information can be acquired easily.

Different ways can be used to blur the background region of the target primary image according to the blurring degree.

Example One

A blurring coefficient of each pixel is acquired according to the blurring degree and the depth of field information of the pixel in the background region of the target primary image. The blurring coefficient is related to the blurring degree. The bigger the blurring coefficient is, the higher the blurring degree is. For example, a product of the blurring degree and the depth of field of each pixel in the background region of the target primary image is calculated to acquire the blurring coefficient of the pixel. The background region of the target primary image is blurred according to the blurring coefficient of each pixel.

Example Two

The bigger the difference between the second depth of field and the depth of field in the focus area is, the farther the corresponding background region is away from the focus area, the less correlation the corresponding background region and the focus area have, the bigger the corresponding blurring degree is. In this embodiment, the relation between the difference between the second depth of field and the depth of field of the focus area and the blurring degree is stored in advance. In this relation, the bigger the difference between the second depth of field and the depth of field of the focus area is, the bigger the corresponding blurring degree is. The difference between the second depth of field of the background region of the target primary image and the depth of field of the focus area is acquired, the corresponding blurring degree is acquired by querying the relation according to the difference, and the background region of the corresponding depth of field is blurred according to the blurring degree.

The implementation of the image processing method according to the embodiments of the present disclosure is described fully in conjunction with the application scenarios.

Figure 6:
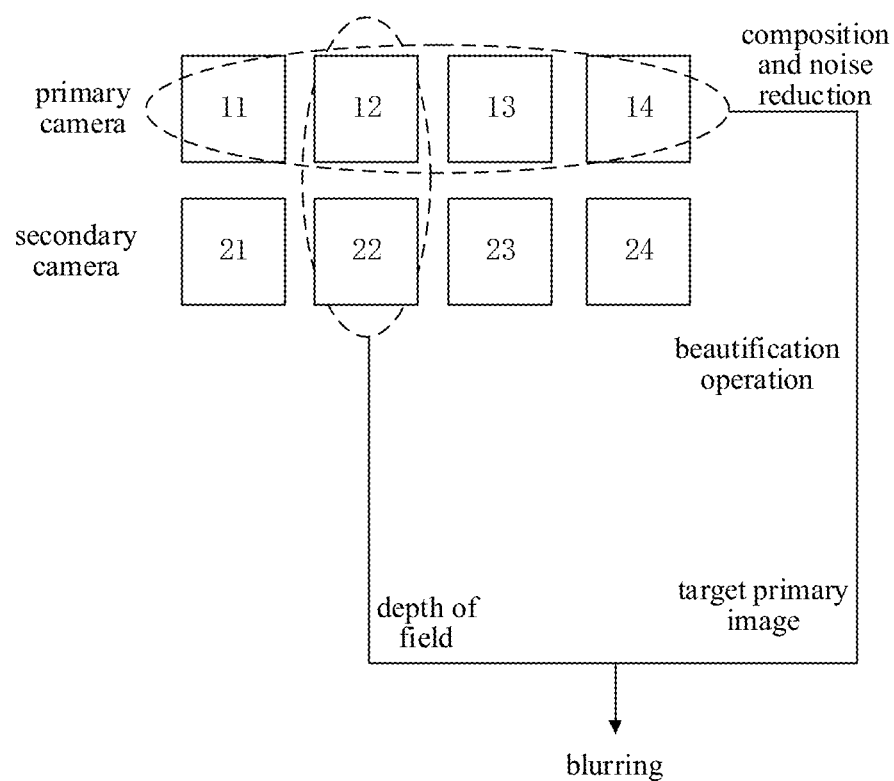
FIG. 6 is a schematic diagram illustrating a scenario of implementing the image processing method according to an embodiment of the present disclosure.

First Scenario:

As illustrated in FIG. 6, after acquiring a capturing instruction, the primary camera and the secondary camera are controlled to capture four frames of primary images and four frames of secondary images simultaneously. According to the capturing sequence, the four frames of primary images are numbered as 11, 12, 13 and 14. The four frames of secondary images are numbered as 21, 22, 23 and 24.

The reference primary image 12 is selected from the plurality of primary images and the secondary primary 22 which is captured to form a pair of images with the reference primary image is selected from the plurality of secondary images. The composition and noise reduction processing is performed on the plurality of primary images and the beautification operation is performed on the composited and noise-reduced image by the first thread to acquire the target primary image, and the depth of field information is acquired by the second thread according to the reference primary image 12 and the reference secondary image 22 simultaneously. If the length of time for the composition and noise reduction processing performed on the primary image is 400 ms, the length of time for the beautification operation is 400 ms, and the length of time for acquiring the depth of field information is 400 ms, in the prior art, the acquisition of the depth of field information and the composition and noise reduction for the primary image are performed in sequence, such that the length of the processing time is 1600 ms. However, according to the image processing method provided by the present disclosure, the length of the processing time is 800 ms, such that the image processing efficiency is improved greatly. Further, the plurality of primary images are captured by the primary camera, and the composition and noise reduction processing is performed on the plurality of primary images, such that the problem of poor image processing effect due to the image processing performed on only one primary image with low quality under the low light environment can be avoided, thus improving the image processing effect.

Figure 7:
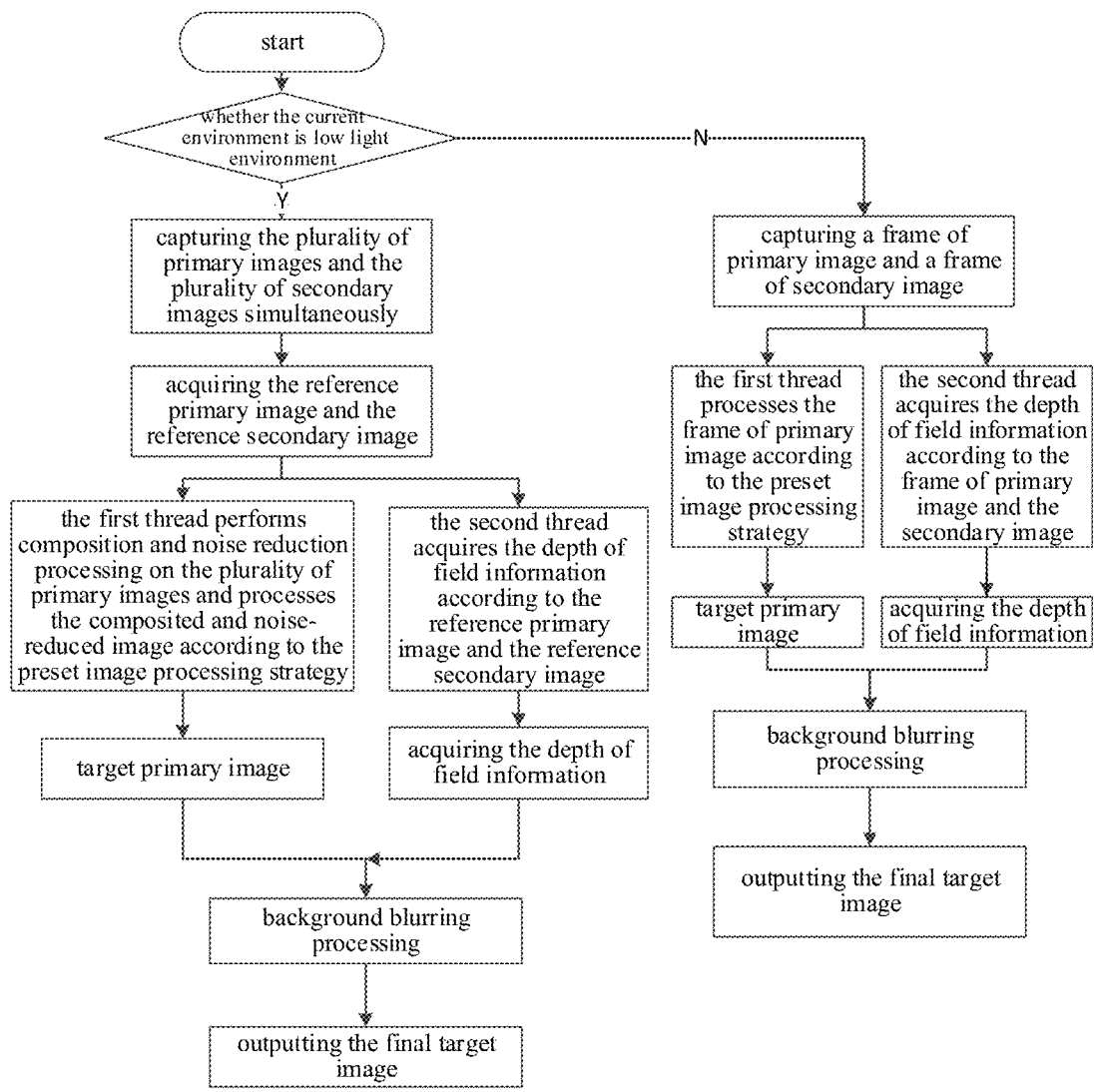
FIG. 7 is a flow chart of an image processing method according to a specific embodiment of the present disclosure.

Second Scenario:

In this scenario, it is determined whether to adopt the multi-frame noise reduction according to the brightness of the current environment. The multi-frame noise reduction is used in the low light environment, but is not used in the high light environment. As illustrated in FIG. 7, the brightness of the capturing environment is detected. When the brightness is less than the predetermined threshold, it indicates that the current environment has low light, the system controls the primary camera and the secondary camera to capture the plurality of primary images and the secondary images simultaneously. One of the plurality primary images is selected as the reference primary image, and the reference secondary image corresponding to the reference primary image is selected (when the second primary image is selected as the reference primary image, the second secondary image is selected).

The composition and noise reduction processing is performed on the plurality of primary images and the composited and noise reduced image is processed according to the image processing strategy by the first thread to generated the target primary image, and simultaneously in the second thread, the depth of field information is acquired according to the reference primary image and the reference secondary image, such that the composition and noise reduction processing and the acquisition of depth of field information can be performed synchronously. The depth of field information is acquired using the image before the multi-frame composition and noise reduction processing, such that the accuracy of acquiring the depth of field information is ensured.

Further, as illustrated in FIG. 7, since the thread costs a long time to acquire the depth of field information, after the composition and noise reduction processing, the beautification operation and the filter applying operation can be performed on the composited and noise reduced image by the thread. After the two threads complete the corresponding operations, the background blurring is performed on the target primary image according to the depth of field information to acquire the final target image. In this way, the final target image has less noise points, and can realize the beautification and filer applying effect, such that the effect of the portrait image is improved greatly and the length of the processing time is not increased significantly.

With the image processing method according to embodiments of the present disclosure, the primary camera is controlled to capture the plurality of primary images, and simultaneously the secondary camera is controlled to capture the plurality of secondary images. The reference primary image is acquired from the plurality of primary images, and the reference secondary image captured to form a pair of images with the reference primary image is acquired from the plurality of secondary images. The first thread performs composition and noise reduction processing on the plurality of primary images and processes the composited and noise-reduced image according to the preset image processing strategy to generate the target primary image, simultaneously the second thread acquires the depth of field information according to the reference primary image and the reference secondary image. The background region of the target primary image is blurred according to the depth of field information. In this way, the image processing is realized by taking full advantage of the time difference between the length of time for acquiring the depth of field information and the length of time for the multi-frame composition and noise reduction processing on the plurality of primary images, such that the accuracy of acquired depth of field information and the image processing efficiency are improved.

Figure 8:
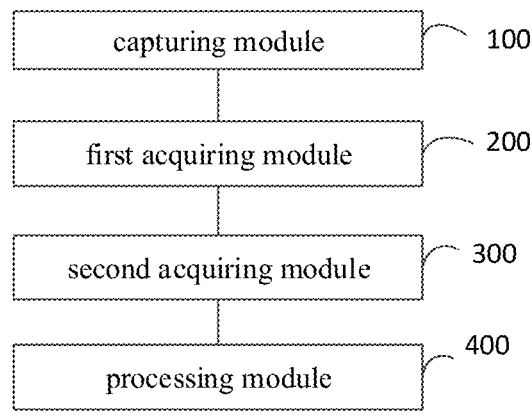
FIG. 8 is a block diagram of an image processing apparatus according to an embodiment of the present disclosure.

In order to implement the above embodiments, the present disclosure further provides an image processing apparatus. FIG. 8 is a block diagram of an image processing apparatus according to an embodiment of the present disclosure. As illustrated in FIG. 8, the image processing apparatus includes a capturing module 100, a first acquiring module 200, a second acquiring module 300 and a processing module 400.

The capturing module 100 is configured to control a primary camera to capture a plurality of primary images and to simultaneously control a secondary camera to capture a plurality of secondary images.

Figure 9:
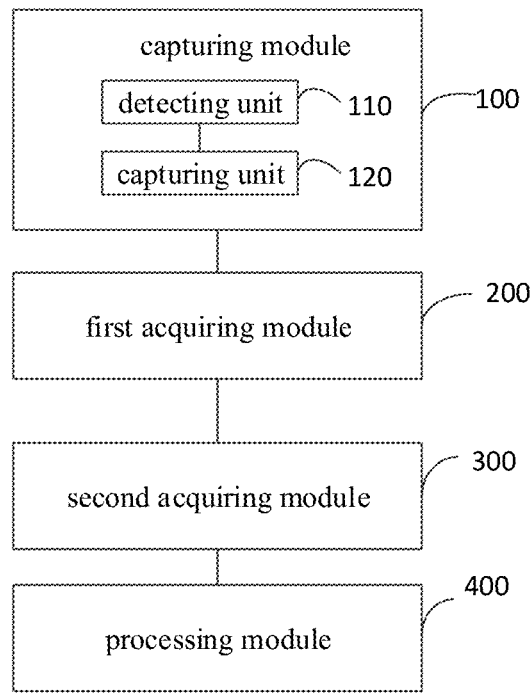
FIG. 9 is a block diagram of an image processing apparatus according to another embodiment of the present disclosure.

In an embodiment, as illustrated in FIG. 9, based on the embodiment described with reference to FIG. 8, the capturing module 100 includes a detecting unit 110 and a capturing unit 120.

The detecting unit 110 is configured to detect brightness of a capturing environment.

The capturing unit 120 is configured to control the primary camera to capture the plurality of primary images and to simultaneously control the secondary camera to capture the plurality of secondary images in response to detecting that the brightness is less than a predetermined threshold.

The first acquiring module 200 is configured to acquire a reference primary image from the plurality of primary images and to acquire a reference secondary image from the plurality of secondary images, the reference secondary image being captured at the same time when the reference primary image is captured.

The second acquiring module 300 is configured to: perform composition and noise reduction processing on the plurality of primary images and process the composited and noise-reduced image according to a preset image processing strategy by a first thread to generate a target primary image and simultaneously acquire depth of field information based on the reference primary image and the reference secondary image by a second thread.

The processing module 400 is configured to blur a background region of the target primary image according to the depth of field information.

Figure 10:
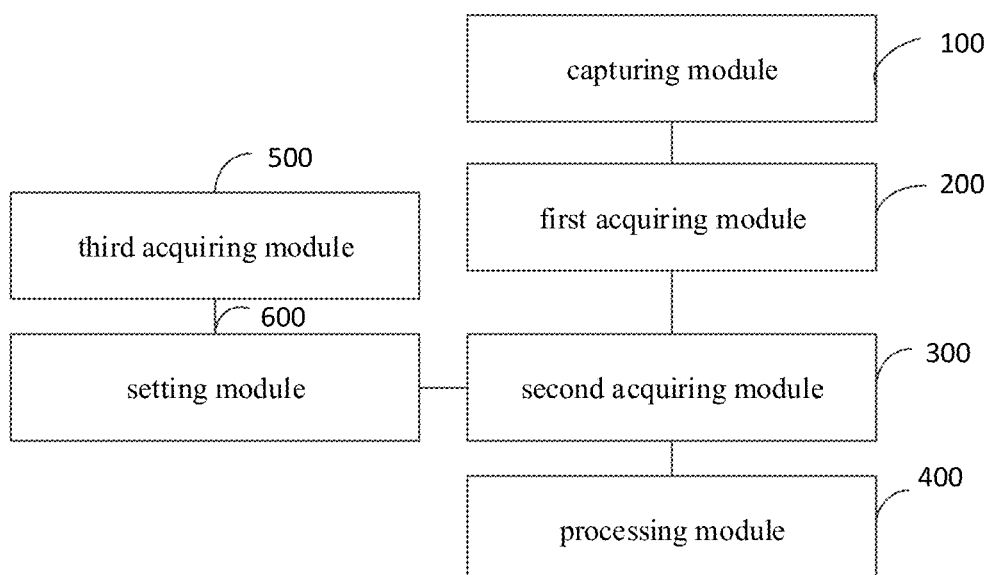
FIG. 10 is a block diagram of an image processing apparatus according to another embodiment of the present disclosure.

In an embodiment, as illustrated in FIG. 10, based on the embodiment described with reference to FIG. 8, the apparatus may further include a third acquiring module 500 and a setting module 600.

The third acquiring module 500 is configured to acquire a first length of time for the composition and noise reduction processing performed by the first thread and to acquire a second length of time for acquiring the depth of field information by the second thread.

The setting module 600 is configured to set the image processing strategy according to a difference between the first length and the second length.

The description of the aforementioned method embodiments is also applicable to the apparatus according to the embodiments of the present disclosure, the implementation principles are similar, which are not described herein.

The above modules of the image processing apparatus are merely exemplary. In other embodiments, the image processing apparatus can be divided into different modules to implement all or a part of functions of the image processing apparatus.

With the image processing apparatus according to embodiments of the present disclosure, the primary camera is controlled to capture the plurality of primary images, and simultaneously the secondary camera is controlled to capture the plurality of secondary images. The reference primary image is acquired from the plurality of primary images, and the reference secondary image captured to form a pair of images with the reference primary image is acquired from the plurality of secondary images. The first thread performs composition and noise reduction processing on the plurality of primary images and processes the composited and noise-reduced image according to the preset image processing strategy to generate the target primary image, simultaneously the second thread acquires the depth of field information according to the reference primary image and the reference secondary image. The background region of the target primary image is blurred according to the depth of field information. In this way, the image processing is realized by taking full advantage of the time difference between the length of time for acquiring the depth of field information and the length of time for the multi-frame composition and noise reduction processing on the plurality of primary images, such that the accuracy of acquired depth of field information and the image processing efficiency are improved.

Figure 11:
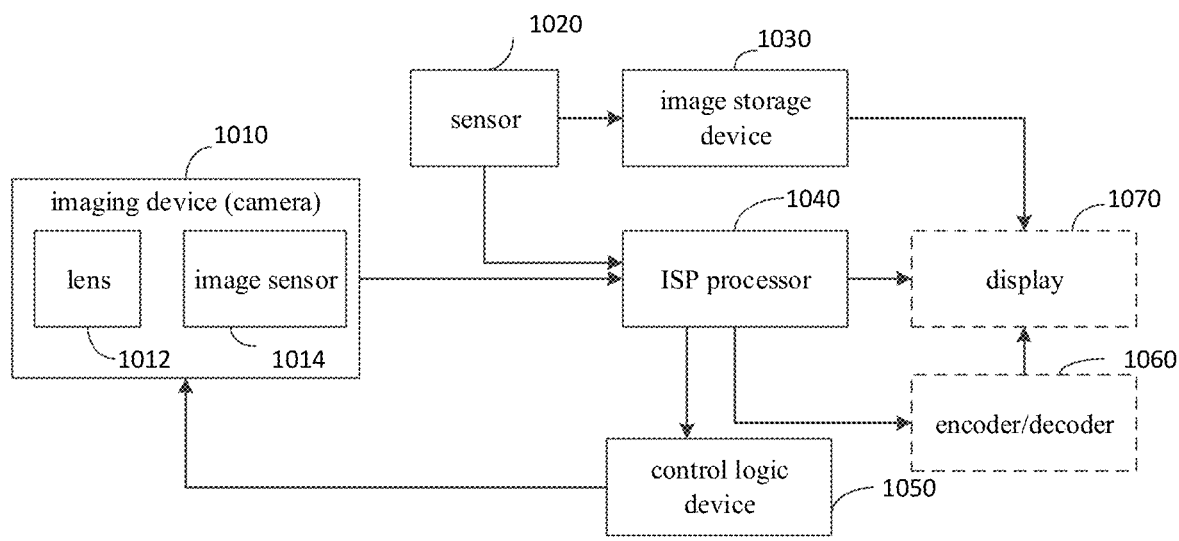
FIG. 11 is a schematic diagram illustrating an image processing circuit according to an embodiment of the present disclosure.

In order to implement the above embodiments, the present disclosure further provides a computer device. The above computer device includes an image processing circuit. The image processing circuit may be implemented by hardware and/or software components, including various processing units for defining an image signal processing (ISP) lines. FIG. 11 is a schematic diagram of an image processing circuit according to an embodiment of the present disclosure. As illustrated in FIG. 11, for ease of description, only aspects of the image processing technology related to the embodiments of the present disclosure are illustrated.

As illustrated in FIG. 11, the image processing circuit includes an ISP processor 1040 and a control logic device 1050. Image data captured by an imaging device 1010 is processed firstly by the ISP processor 1040. The ISP processor 1040 analyzes the image data to capture image statistical information for determining and/or one or more control parameters of the imaging device 1010. The imaging device 1010 may include a camera having one or more lenses 1012 and an image sensor 1014. The image sensor 1014 may include a color filter array (such as Bayer filter). The image sensor 1014 may acquire light intensity and waveform information captured by each imaging pixel of the image sensor 1014, and provides a set of original image data which can be processed by the ISP processor 1040. The sensor 1020 provides the original image data to the ISP processor 1040 based on an interface type of the sensor 1020. The interface of the sensor 1020 may utilize a standard mobile imaging architecture (SMIA) interface, other serial or parallel camera interfaces, or a combination of the above interfaces.

The ISP processor 1040 processes the original image data pixel-wise according to various forms. For example, each imaging pixel may have a bit depth of 8, 10, 12, or 14 bits. The ISP processor 1040 may perform one or more image processing operations on the original image data and collect statistical information of the image data. The image processing operation can be performed the same or different bit depth precision.

The ISP processor 1040 may receive pixel data from an image storage device 1030. For example, the original pixel data can be sent to the image storage device 1030 from the interface of the sensor 1020. The original pixel data in the image storage device 1030 is further provided to the ISP processor 1040 for processing. The image storage device 1030 may be a part of a memory, a storage device, or a separate specific storage device in an electronic device, and can include a feature of direct memory access (DMA).

When receiving the original image data from the interface of the sensor 1020 or the image storage device 1030, the ISP processor 1040 may perform one or more image processing operations, such as time-domain filtering. The processed image data may be sent to the image storage device 1030, such that further processing can be performed before displaying. The ISP processor 1040 may receive the processed data from the image storage device 1030, and perform the image data processing on the processed data in the original domain and the color space of RGB and YCbCr. The processed image data can be outputted to the display 1070 for being viewed by a user and/or further processed by a graphics processing unit (GPU). In addition, the output of the ISP processor 1040 can be further sent the image storage device 1030, and the display 1070 can read the image data from the image storage device 1030. In an embodiment, the image storage device 1030 can be configured to implement one or more frame buffers. Further, the output of the ISP processor 1040 can be sent to an encoder/decoder 1060 for being encoded/decoded. The encoded image data can be stored, and decoded before being displayed on the display 1070. The encoder/decoder 1060 can be implemented by the CPU or GPU or coprocessor.

The statistical data determined by the ISP processor 1040 can be sent to the control logic device 1050. For example, the statistical data may include statistical information of the image sensor 1040 subjected to automatic exposure, automatic white balance, automatic focusing, scintillation detection, black level compensation and shading correction of lens 1012. The control logic device 1050 may include a processor and microcontroller for executing one or more routines (firmware). The one or more routines may determine control parameters of the imaging device 1010 according to the received statistical data. For example, the control parameters may include control parameters of the sensor 1020 (such as gain, integral time of exposure control), flash control parameters of the camera, control parameters of the lens 1012 (such as focusing or zooming focus length) or a combination of these control parameters. The control parameters of the ISP may include a gain level and a color correction matrix for automatic white balance and color adjustment (for example, during RGB processing), and a shading correction parameter of the lens 1012.

The image processing technology in FIG. 11 can be used to implement the image processing method including: controlling a primary camera to capture a plurality of primary images and simultaneously controlling a secondary camera to capture a plurality of secondary images; acquiring a reference primary image from the plurality of primary images and acquiring a reference secondary image from the plurality of secondary images, the reference secondary image and the reference primary image being captured in an association manner and forming a pair of images; performing composition and noise reduction processing on the plurality of primary images by a first thread to generate a composited and noise-reduced image and processing the composited and noise-reduced image according to a preset image processing strategy to generate a target primary image and simultaneously acquiring depth of field information based on the reference primary image and the reference secondary image by a second thread; and blurring a background region of the target primary image according to the depth of field information.

In order to implement the above embodiments, the present disclosure further provides a non-transitory computer-readable storage medium. When instructions in the storage medium are executed by a processor, the processor is caused to perform the image processing method.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, those skilled in the art could combine different embodiments or different characteristics in embodiments or examples described in the present disclosure.

Moreover, terms of "first" and "second" are only used for description and cannot be seen as indicating or implying relative importance or indicating or implying the number of the indicated technical features. Thus, the features defined with "first" and "second" may comprise or imply at least one of these features. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc. Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. An image processing method, comprising:
controlling a first camera to capture a plurality of first images and controlling a second camera to capture a plurality of second images;
acquiring a first reference image from the plurality of first images and acquiring a second reference image from the plurality of second images, the second reference image and the first reference image being captured in an association manner and forming a pair of images;
performing composition and noise reduction processing on the plurality of first images by a first thread to generate a composited and noise-reduced image and processing the composited and noise-reduced image according to a preset image processing strategy to generate a target image, and acquiring depth of field information based on the first reference image and the second reference image by a second thread; and
blurring a background region of the target image according to the depth of field information;

wherein acquiring the first reference image from the plurality of first images and acquiring the second reference image from the plurality of second images comprises:
selecting a set of first images from the plurality of first images, each first image in the set of first images having a definition greater than a predetermined definition;
selecting a set of second images from the plurality of second images, each second image in the set of second images forming the pair of images with a respective first image in the set of first images; and
selecting the first reference image from the set of first images and selecting the second reference image from the set of second images.

2. The method according to claim 1, wherein controlling the first camera to capture the plurality of first images and controlling the second camera to capture the plurality of second images, comprises:
detecting brightness of a capturing environment; and
in response to detecting that the brightness is less than a predetermined threshold, controlling the first camera to capture the plurality of first images and controlling the second camera to capture the plurality of second images.

3. The method according to claim 1, wherein performing the composition and noise reduction processing on the plurality of first images by the first thread to generate the composited and noise-reduced image comprises:
reading out values of a pixel corresponding to a same position in the plurality of first images;
calculating an average value of the values; and
determining the average value as a value of the pixel corresponding to the same position in the composited and noise-reduced image.

4. The method according to claim 1, wherein acquiring the depth of field information based on the first reference image and the second reference image comprises:
calculating a distance Z between an object to be captured and a plane where the first camera $$Z = \frac{B \cdot f}{X_R - X_T} = \frac{B \cdot f}{d};$$

and the second camera are located according to a formula of where B represents a distance between the first camera and the second camera, assuming that points P and P' respectively represent positions of the object to be captured in the first reference image and the second reference image, $X_R$ represents a distance between the point P and a left boundary of the first reference image, $X_T$ represents a distance between the point P' and a left boundary of the second reference image, f represents a distance between the plane and a focus plane, d represents a distance between the positions of the object to be captured in the first reference image and the second reference image.

5. The method according to claim 1, wherein blurring a background region of the target image according to the depth of field information comprises:
acquiring a first depth of field of a foreground region and a second depth of field of the background region;
generating a blurring degree according to the first depth of field and the second depth of field; and
blurring the background region of the target image according to the blurring degree.

6. The method according to claim 5, wherein acquiring the first depth of field of the foreground region and the second depth of field of the background region comprises:
acquiring capturing parameters; and
determining the first depth of field of the foreground region and the second depth of field of the background region according to formulas and the capturing parameters.

7. The method according to claim 6, wherein the capturing parameters comprise:
a diameter of a permissible circle of confusion, f-number, a focus length, a focusing distance of the first camera;
determining the first depth of field of the foreground region and the second depth of field of the background region according to formulas and the capturing parameters comprises:
determining the first depth of field of the foreground region according to a formula of:
first depth of field=(f-number*diameter of the permissible circle of confusion*square of focusing distance)/(square of focus length+f-number*diameter of the permissible circle of confusion*focusing distance); and
determining the second depth of field of the background region according to a formula of:
second depth of field=(f-number*diameter of the permissible circle of confusion*square of focusing distance)/(square of focus length—f-number*diameter of the permissible circle of confusion*focusing distance).

8. The method according to claim 5, wherein acquiring the first depth of field of the foreground region and the second depth of field of the background region comprises:
acquiring a depth of field map of an imaging area beyond the focus area according to data of current captured images acquired by the first and second cameras; and
determining the first depth of field of the foreground region and the second depth of field of the background region according to the depth of field map.

9. The method according to claim 5, wherein blurring the background region of the target image according to the blurring degree comprises:
acquiring a blurring coefficient of each pixel in the background region of the target image according to the blurring degree and a depth of field of the pixel; and
blurring the background region of the target image according to the blurring coefficient of each pixel.

10. The method according to claim 9, wherein acquiring a blurring coefficient of each pixel in the background region of the target image according to the blurring degree and the depth of field of the pixel comprises:
determining a product of the blurring degree and the depth of field of the pixel in the background region of the target image as the blurring coefficient of the pixel.

11. The method according to claim 5, wherein blurring the background region of the target image according to the blurring degree comprises:
acquiring a difference between the second depth of field of the background region of the target image and a depth of field of a focus area;
acquiring the blurring degree corresponding to the difference according to a pre-stored correspondence between blurring degrees and differences between the second depths of field of the background region and the depths of field of the focus area; and
blurring the background region of the target image according to the blurring degree.

12. The method according to claim 1, further comprising:
acquiring a first length of time for the composition and noise reduction processing performed by the first thread and acquiring a second length of time for acquiring the depth of field information by the second thread; and
setting the image processing strategy according to a difference between the first length of time and the second length of time.

13. The method according to claim 2, further comprising:
in response to detecting that the brightness is greater than or equal to the predetermined threshold, controlling the first camera to capture a frame of first image and controlling the second camera to capture a frame of second image;
processing the frame of first image according to the preset image processing strategy by the first thread to generate the target image and acquiring the depth of field information based on the frame of first image and the frame of second image by the second thread; and
blurring the background region of the target image according to the depth of field information.

14. The method according to claim 13, further comprising:
acquiring a length of time for acquiring the depth of field information by the second thread; and
setting the image processing strategy according to the length of time for acquiring the depth of field information by the second thread.

15. A computer device, comprising a memory, a processor, and a computer program stored on the memory and executable on the processor, wherein when the processor executes the computer program, the processor is caused to perform the image processing method comprising:
controlling a first camera to capture a plurality of first images and controlling a second camera to capture a plurality of second images;
acquiring a first reference image from the plurality of first images and acquiring a second reference image from the plurality of second images, the second reference image and the first reference image being captured in an association manner and forming a pair of images;
performing composition and noise reduction processing on the plurality of first images by a first thread to generate a composited and noise-reduced image and processing the composited and noise-reduced image according to a preset image processing strategy to generate a target image and acquiring depth of field information based on the first reference image and the second reference image by a second thread; and
blurring a background region of the target image according to the depth of field information;
wherein acquiring the first reference image from the plurality of first images and acquiring the second reference image from the plurality of second images comprises:
selecting a set of first images from the plurality of first images, each first image in the set of first images having a definition greater than a predetermined definition;
selecting a set of second images from the plurality of second images, each second image in the set of second images forming the pair of images with a respective first image in the set of first images; and
selecting the first reference image from the set of first images and selecting the second reference image from the set of second images.

* * * * *